United States Patent Office 2,827,363
Patented Mar. 18, 1958

2,827,363

PREPARATION OF HYDROXYLAMINE

Edwin G. Marhofer, Pittsburg, Kans., assignor to Spencer Chemical Company, a corporation of Missouri No Drawing. Continuation of application Serial No. 390,245, November 4, 1953. This application April 12, 1956, Serial No. 577,670

12 Claims. (Cl. 23—190)

This invention relates to a new process for the production of hydroxylamine salts.

This application is a continuation of my copending application, Serial No. 390,245, filed November 4, 1953, which is a continuation-in-part of my copending application, Serial No. 376,265, filed August 24, 1953, both of which applications are now abandoned.

Hydroxylamine is a valuable intermediate in the preparation of a number of chemical compounds. When employed as such intermediate, it is used in the form of various acid salts, since the free base is unstable.

Previously hydroxylamine salts have been produced by several methods. The classical method involves the reduction of sodium nitrite with sodium bisulfite and sulfur dioxide to give sodium hydroxylamine-N,N-disulfonate, followed by hydrolysis of the hot solution to give hydroxylammonium acid sulfate (also called hydroxylamine acid sulfate) and by-product sodium sulfate. This is an expensive process involving several steps, and results in a direct loss of at least one mole of sulfuric acid per mole of product.

A more recent commercial process involves the reaction of sulfuric acid with a nitro-paraffin such as nitromethane to produce the acid sulfate salt and by-product carbon monoxide. The raw material nitromethane is a relatively expensive one and the carbon values are a direct loss.

The present invention provides a novel and inexpensive means of synthesizing hydroxylamine salts. It uses raw materials which are cheap and available in commerce in large volume, and produces high conversion yields therefrom.

The process of the invention involves the hydrogenation of nitric acid in an aqueous or aqueous alcoholic medium in the presence of rhodium as a catalyst at atmospheric or superatmospheric pressure and at room temperature or above, with or without the presence of acid additives.

Since the catalyst used is reactive with the acid, one of the important factors in this invention is the maintenance of hydrogen at the catalyst-acid interface. Thus, I have found it highly important that a continuous supply of hydrogen be furnished to the catalyst. The simplest way of assuring this is to keep an excess of hydrogen available and to agitate the reactive mixture constantly in such a way as to bring fresh hydrogen continuously to the catalyst.

A similar process of reducing nitric acid to form hydroxylamine which employs various other catalysts is described in the application filed by Willard Clare Bull, Paul Donovan Strickler, Harry Charles Zeisig, Jr. and me as co-inventors, Serial No. 370,884 filed July 28, 1953.

*Form of catalyst.*—Various concentrations of the rhodium catalyst may be used effectively. In addition, various acid insoluble carriers—such as carbon, alumina, asbestos, kieselguhr, Pyrex, quartz, quartz-Pyrex pellets, and silica gel—may be used. (The term "Pyrex" is used in this specification to mean a type of glass well known to those skilled in the art which is both heat and chemical resistant.) The catalyst I prefer is 5% rhodium on active carbon.

The catalyst and associated carrier are preferably used in the reaction mixture of this invention in powdered form. However, they may also be used in any other form (granular, for instance) that assures the maintenance of a continuous supply of hydrogen at the catalyst-acid interface.

The acid should preferably not be present with the catalyst for any period of time before the catalyst is brought into contact with the hydrogen. The preferred procedure is to saturate the catalyst and the water with hydrogen gas before any acid is placed in the reactor.

*Acid additive.*—There may be present during the hydrogenation acid additives such as sulfuric, acetic, formic, and phosphoric acids. Of these sulfuric acid is preferable. Apparently almost any acid forming a relatively stable salt with hydroxylamine can be used.

While the use of an additive may be desirable, it is not absolutely necessary, since good conversions to hydroxylamine can be obtained without such additives.

One advantage to using no acid additive is that the reduction of the nitric acid can be carried to a predetermined pressure drop indicating a desired percentage reduction of the nitric acid present. This generally results in shorter reaction times than when an acid additive is used, since in the latter case the reduction is ordinarily carried out until there is no further pressure drop.

If no acid additive is used, the percentage reduction of the nitric acid should never be taken to more than 50%, or the reaction mixture will become basic due to the formation of hydroxylamine and ammonia. In such case the nitric acid and hydroxylamine would be completely reduced to ammonia.

*Optimum molecular ratio of acids.*—Using sulfuric acid as an additive, it has been found that with low concentrations of nitric acid the best results are obtained when the mole ratio of sulfuric to nitric acid lies in the range between about 0.5 to 1 and about 1.5 to 1.

It has also been found that the optimum ratio of sulfuric to nitric acid depends in part on the concentration of the nitric acid. With still lower concentrations of nitric acid than those just referred to, a substantial conversion to hydroxylamine salts is obtained even when the mole ratio of sulfuric to nitric acid is above 4 to 1. On the other hand, with higher concentrations of nitric acid substantial conversion is obtained only when the mole ratio of sulfuric to nitric acid is no higher than somewhere between 1.0 to 1 and 1.5 to 1.

*Corrosion.*—When sulfuric acid is used as an additive, severe corrosion occurs in the hydrogenation reactor and in the pumps and lines handling the mixed acids prior to reduction. It has been found that stainless steels of the 18–8 class and many other corrosion resistant metals and metal alloys are not suitable materials of construction.

In general, I prefer to use non-ferrous materials such as glass, Saran, polyethylene, Teflon, and ceramics. For example, a glass lined autoclave has been found to be a perfectly satisfactory reaction vessel.

The two acids may also be injected separately into an agitated reactor with equally good conversion results and substantially reduced maintenance problems.

Corrosion problems are substantially reduced if nitric acid is hydrogenated along with no added acid.

*Concentration of nitric acid.*—It has been found that when nitric acid is reduced without an acid additive, there is a critical maximum concentration of nitric acid above which this process is inoperable because of catalyst solution. This critical maximum seems to be about 24.5% when the process is carried out at 50 p. s. i. g. (pounds per square inch, gauge) and at approximately room temperature.

However, lowering the reaction temperature to 0° C. increases to as high as 40% the concentration of nitric acid that can be successfully reduced by the method of this invention. Further lowering of the reaction temperature may increase the critical maximum for the nitric acid concentration to a still higher figure.

Other modification of the conditions of the process may also increase this critical maximum figure. It is pointed out below, for instance, that catalyst solution seems to be a function of the hydrogen pressure, and it is quite possible that increasing the pressure will raise the critical maximum nitric acid concentration.

*Alcohol as solvent.*—In addition to the aqueous solution of nitric acid and acid additives referred to, use of an aqueous alcoholic medium produces good results.

*Pressure.*—The reaction rate varies with pressure, the rate being increased as the pressure under which the reaction is carried out is increased. This effect is more marked at higher acid concentrations than at lower; apparently in the latter case the rate of migration of the ions (rather than the elemental hydrogen) to the catalyst is more important.

Increased pressure helps to maintain the hydrogen at the catalyst-acid interface, and thereby reduces solution of the catalyst in the acid medium. However, increased pressure also tends to produce more ammonia, which (as noted below) is a by-product of the reduction of the nitric acid.

This process is operable at pressures as high as 4500 p. s. i. g. At least when sulfuric acid is used as the additive, however, increased pressure is only mildly beneficial in its effect on reaction rate and conversion to hydroxylamine. Thus, with sulfuric acid present I prefer to operate in the range of atmospheric pressure to about 300 p. s. i. g. as being more economical equipmentwise with only slightly lower yields of hydroxylamine.

*Temperature.*—The reaction rate in this invention also varies slightly with temperature. Higher temperatures increase the rate of reaction somewhat.

However, there is an upper limit to the temperature which may be used. In the first place, if the initial temperature of the reaction mixture is too high, the catalyst will go into solution in the acid before the reduction can proceed. The maximum starting temperature is preferably about 45° C.

There is also an upper limit above which the temperature of the mixture should not be permitted to rise at any time during the reaction. This is determined by the temperature above which the catalyst will go into solution for the acid system, temperature, and pressure used, and the temperature at which the hydroxylamine endproducts of the reaction will decompose.

The latter factor sets an upper limit of 170° C. when the acid additive is sulfuric acid. However, the upper practical limit of temperature to avoid solution of the catalyst in the acid systems I have employed is probably about 125° C. In fact, for ease of control of this exothermic reaction I prefer to operate under controlled temperature conditions in the range of normal room temperatures or normal cooling water temperatures.

*Ammonia by-product.*—Active catalysts generally coproduce a considerable amount of ammonia in addition to the hydroxylamine produced in this reduction. (See Examples 1 through 8 below.) It seems to make little difference in this respect whether an acid additive is used or not.

However, when an aqueous alcoholic medium is used as described above, the amount of ammonia formed is usually larger.

The production of ammonia is reduced if the activity of the rhodium catalyst is somewhat depressed by a certain amount of catalyst poisoning, so that the hydroxylamine is not entirely reduced to ammonia. Thus, dissolution of some copper from the hydrogenation apparatus used, or the deliberate addition of a small amount of copper, has been found to have beneficial results. It is probable that alloying the rhodium with another metal to depress catalyst activity would also have beneficial results.

The following examples will more particularly show the detailed practice of my invention, but are not to be considered as limiting. In these examples conversion is expressed as percent of nitric acid which is converted to hydroxylamine, ammonia, or nitrogen; catalyst concentration is percent by weight of metal to total weight of catalyst; and catalyst weight is that of metal plus carrier. The apparatus and agitation procedure used in Example 1 were also used in all the other examples.

*Example 1*

A mixture containing 0.097 mole $HNO_3$, 0.122 mole $H_2SO_4$, 2.26 moles water, and 0.5 gm. of 5% rhodium on carbon was placed in a glass bottle in a Parr hydrogenation apparatus equipped with a rocking device, and hydrogen was introduced to an initial pressure of 50 p. s. i. g. at room temperature. There was a pressure drop of 15 p. s. i. g. after 60 minutes of agitation of this mixture.

Fourty-four percent of the nitric acid was converted. Of this, the following percentages were converted to the indicated products:

| | Percent |
|---|---|
| $NH_2OH$ | 27.6 |
| $NH_3$ | 72.0 |
| $N_2$ | 0.4 |

*Example 2*

A mixture 0.096 mole $HNO_3$, 0.122 mole $H_2SO_4$, 2.26 moles water, and 0.5 gm. of 5% rhodium on carbon was reduced at an initial hydrogen pressure of 30 p. s. i. g. and at room temperature for 86 minutes. The pressure drop was 15.5 p. s. i. g.

Forty-six percent of the nitric acid was converted. Of this, the following percentages were converted to the indicated products:

| | Percent |
|---|---|
| $NH_2OH$ | 8.9 |
| $NH_3$ | 90.1 |
| $N_2$ | 0.0 |

*Example 3*

A mixture containing 0.291 mole $HNO_3$, 3.14 moles water, and 0.5 gm. of 5% rhodium on carbon was reduced at an initial hydrogen pressure of 31.5 p. s. i. g. and at room temperature for 103 minutes. The pressure drop was 15.0 p. s. i. g.

Fifty percent of the nitric acid was converted. Of this, the following percentages were converted to the indicated products:

| | Percent |
|---|---|
| $NH_2OH$ | 26.8 |
| $NH_3$ | 62.8 |
| $N_2$ | 10.4 |

*Example 4*

A mixture containing 0.291 mole $HNO_3$, 3.14 moles water, and 0.5 gm. of 5% rhodium on carbon was reduced at an initial hydrogen pressure of 50 p. s. i. g. and at room temperature for 99 minutes. The pressure drop was 26.2 p. s. i. g.

Twenty-seven and eight-tenths percent of the nitric acid was converted. Of this, the following percentages were converted to the indicated products:

|        | Percent |
|--------|---------|
| $NH_2OH$ | 10.5 |
| $NH_3$   | 83.3 |
| $N_2$    | 6.2  |

Example 5

A mixture containing 0.145 mole $HNO_3$, 3.65 moles water, and 0.5 gm. of 5% rhodium on carbon was reduced at an initial hydrogen pressure of 41 p. s. i. g. and at room temperature for 70 minutes.

Twenty-seven and seven-tenths percent of the nitric acid was converted. Of this, the following percentages were converted to the indicated products:

|        | Percent |
|--------|---------|
| $NH_2OH$ | 20.7 |
| $NH_3$   | 78.0 |
| $N_2$    | 1.3  |

Example 6

Hydrogenation of 0.278 mole $HNO_3$ and 3.14 moles water in the presence of 0.5 gm. of 5% rhodium on carbon and the indicated amounts of copper was carried out at an initial pressure of 50 p. s. i. g. and at room temperature for the times shown and with the following results:

| Milligrams of Copper Added | Hydrogenation Time in Minutes | Percent $HNO_3$ Reduced | Percent $NH_2OH$ | Percent $NH_3$ | Percent Loss |
|---|---|---|---|---|---|
| 0   | 120 | 21.5 | 7.4  | 92.6 | 0.0  |
| 1.3 | 120 | 23.4 | 13.0 | 82.5 | 4.5  |
| 2.6 | 250 | 16.9 | 64.2 | 35.8 | 0.0  |
| 3.9 | 250 | 11.8 | 63.9 | 33.0 | 3.1  |
| 7.8 | 250 | 9.5  | 50.0 | 37.0 | 13.0 |

The percentage figures for production of hydroxylamine and ammonia are in terms of percent of the nitric acid which was converted. It is seen that the best conversion yield was obtained when 2.6 milligrams of copper were added to the reaction mixture, or in other words about 0.01 gram of copper per mole of nitric acid.

Example 7

A mixture containing 0.111 mole $HNO_3$, 0.057 mole $H_3PO_4$, 3.14 moles water, and 0.5 gm. of 5% rhodium on carbon was reduced for 195 minutes.

Fifty-eight and one-half percent of the nitric acid was converted. Of this, the following percentages were converted to the indicated products:

|        | Percent |
|--------|---------|
| $NH_2OH$ | 5.4 |
| $NH_3$   | 31.0 |

Example 8

A mixture containing 0.111 mole $HNO_3$, 0.176 mole $HC_2H_3O_2$, 3.14 moles water, and 0.5 gm. of 5% rhodium on carbon was reduced for 165 minutes.

Fifty-eight and one-half percent of the nitric acid was converted. Of this, the following percentages were converted to the indicated products:

|        | Percent |
|--------|---------|
| $NH_2OH$ | 31.0 |
| $NH_3$   | 69.0 |

It is important to understand that while for simplicity we have spoken in the above examples of conversions to hydroxylamine base, the actual product obtained was a hydroxylamine acid salt. Thus when sulfuric acid is used as the additive hydroxylamine sulfate and ammonium sulfate are produced in the reaction mixture, and if no acid additive is used hydroxylamine nitrate and ammonium nitrate are produced.

The hydroxylamine salts can be separated from the reaction mixture by means well known to those skilled in the art.

The foregoing detailed description has been given for clearness of understanding only. No unnecessary limitations should be understood therefrom, as modifications will be obvious to those skilled in the art.

What is claimed is:

1. The process of producing hydroxylamine which comprises bringing together an aqueous solution of nitric acid, molecular hydrogen, and an active rhodium catalyst at a temperature from above about the freezing point of the reaction mixture to a temperature of 170° C., the hydrogen being provided at the catalyst-acid interface at least prior to any appreciable dissolution of the catalyst so that dissolution of the catalyst is prevented, maintaining hydrogen at the catalyst-acid interface during reaction, and recovering the hydroxylamine so produced.

2. The process of claim 1 in which the reaction is effected at about 0° C. to 125° C.

3. The process of claim 1 in which the rhodium catalyst is supported on an acid insoluble carrier selected from the group consisting of activated carbon, charcoal, alumina, asbestos, silica gel, quartz, Pyrex, quartz-Pyrex pellets and kieselguhr.

4. The process of claim 1 in which the rhodium catalyst is supported on an inert carrier, with the rhodium metal concentration lying between 0.005 and .05 gram of rhodium per gram of nitric acid, and a reaction temperature from 0° C. to 125° C.

5. The process of claim 1 in which the concentration of nitric acid in terms of the water present is no greater than 40% by weight.

6. The process of claim 1 in which the hydrogen is supplied at an initial superatmospheric pressure.

7. The process of claim 1 in which the reaction is carried out at a pressure in the range of 0 to 500 pounds per square inch gauge pressure with continual agitation.

8. The process of claim 1 in which the mixture is agitated during reaction.

9. The process of claim 1 in which the aqueous nitric acid solution contains an added member of the group consisting of acetic acid, formic acid, sulfuric acid and phosphoric acid.

10. The process of claim 9 in which the reaction is effected at about 0° C. to 125° C.

11. The process of claim 9 in which nitric acid and sulfuric acid are present in the ratio of one-half to four moles of nitric acid to a mole of sulfuric acid.

12. The process of claim 11 in which the catalyst is active rhodium supported on powdered carbon and the reaction is carried out at a pressure in the range of 0 to 500 pounds per square inch gauge pressure with continual agitation.

References Cited in the file of this patent

UNITED STATES PATENTS

| 2,628,888 | Benson | Feb. 17, 1953 |

FOREIGN PATENTS

| 10,094 | Great Britain | 1902 |

OTHER REFERENCES

J. W. Mellor's "A Comprehensive Treatise on Inorganic and Theoretical Chem.," vol. 8, 1928 ed., pages 280 and 584. Longmans, Green & Co., New York.